May 23, 1950 H. D. SMITH 2,508,777
DEVICE FOR DETERMINING AXLE-ENGAGING POSITIONS
OF AXLE BLOCKS FOR A VEHICLE LIFT
Filed March 20, 1947 2 Sheets-Sheet 1

INVENTOR.
Harry D. Smith
BY Rudolph L. Lowell
Attorney

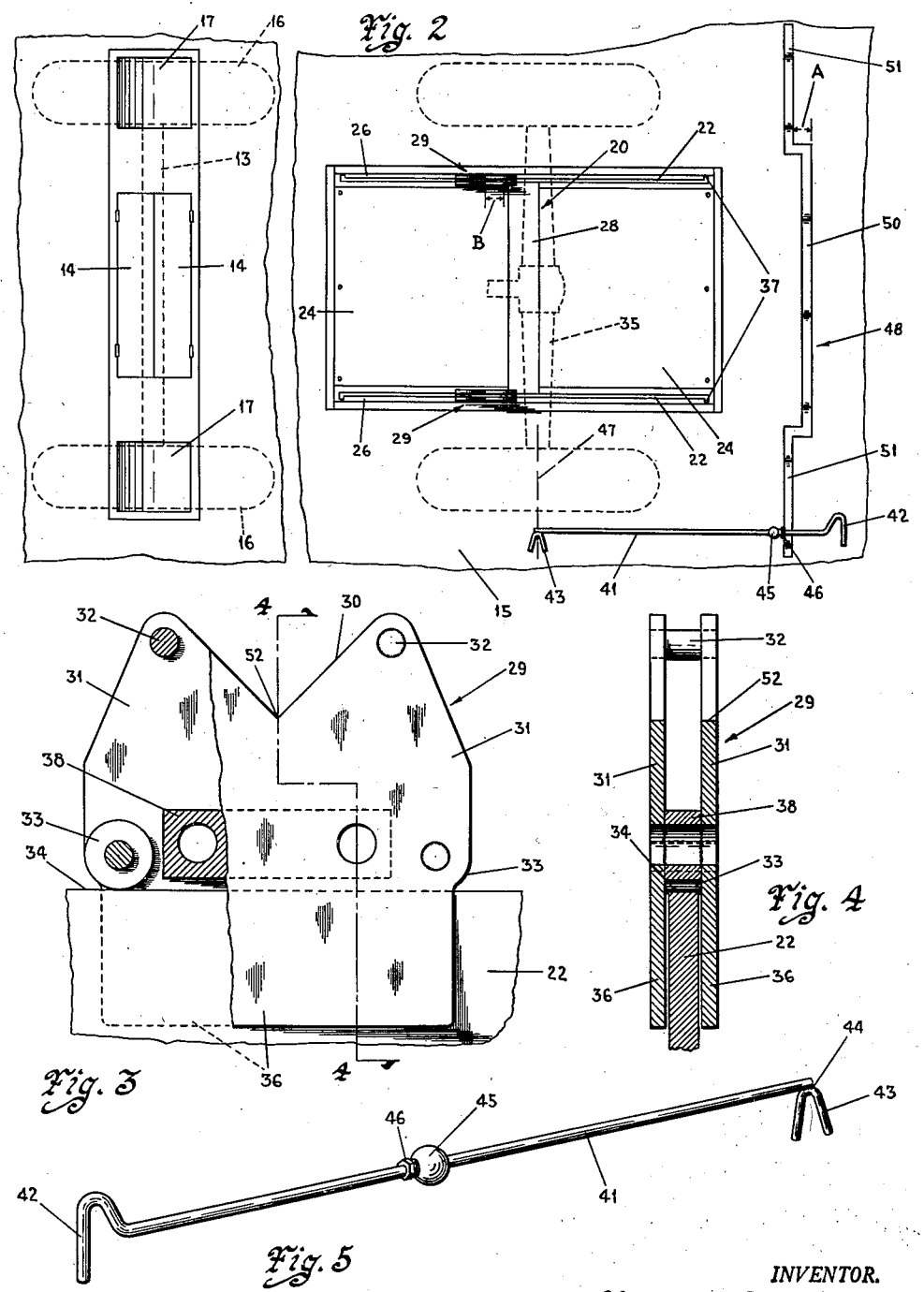
May 23, 1950    H. D. SMITH    2,508,777
DEVICE FOR DETERMINING AXLE-ENGAGING POSITIONS
OF AXLE BLOCKS FOR A VEHICLE LIFT
Filed March 20, 1947    2 Sheets-Sheet 2
INVENTOR.
Harry D. Smith Patented May 23, 1950

2,508,777

UNITED STATES PATENT OFFICE 2,508,777

DEVICE FOR DETERMINING AXLE-ENGAGING POSITIONS OF AXLE BLOCKS FOR A VEHICLE LIFT

Harry D. Smith, Philadelphia, Pa., assignor to Globe Hoist Company, Des Moines, Iowa, a corporation of Iowa Application March 20, 1947, Serial No. 735,831

1 Claim. (Cl. 33—180)

This invention relates generally to vehicle lifts and in particular to a device for determining the positions of longitudinally adjustable axle blocks when a vehicle is in a position to be elevated.

In vehicle hoists now in general use, and equipped with longitudinally adjustable or movable axle engaging blocks, the practice usually followed is to drive a vehicle over the hoist to a position to be elevated, and then by means of a hooked rod or the like, the hoist operator moves the blocks to positions at which he believes they will engage the vehicle axle. The hoist is then elevated to a height at which the blocks are in substantial engagement with the axle, and the operator observes the position of the blocks relative to the axle. In the event the blocks are out of an axle-engaging position, they are again adjusted, either directly or by first lowering the hoist, to provide for their free movement relative to the vehicle axle. Appreciable loss in time and inconvenience is encountered by this cut and try method to provide for a proper setting of the blocks to positively engage and support the vehicle axle.

It is an object of this invention, therefore, to provide an improved device for determining the angle-engaging positions of axle blocks when the vehicle is in a position to be elevated and prior to any operation of the hoist.

A further object of this invention is to provide for the adjustment of axle blocks to axle-engaging positions with a minimum of time and inconvenience to the hoist operator.

Yet another object of this invention is to provide a device for setting longitudinally movable axle blocks to axle engaging positions, which is of a simple construction, efficient in operation, and applicable to both single post and two post hoists.

A feature of this invention is found in the provision of a device for determining the axle-engaging position of an adjustable axle block as soon as a vehicle is in a position to be elevated, which includes a rod member provided at one end with a hook of a construction to be connected with the axle block at a predetermined position relative to the axle engaging portion of the block. A slide member on the rod is adjustably movable, so that when the rod is extended longitudinally of the hoist and to one side thereof, with its hooked end centered relative to the vehicle axle to be engaged, the slide member is movable to a position in line with a transverse gauge line or marker arranged outwardly from one end of the hoist so that the distance between the slide member and the hook is substantially equal to the distance between the center of the vehicle axle and the marker. When the rod is then hooked with the block, movement thereof to again locate the slide member in line with the transverse marker, concurrently provides for the movement of the block to an axle-engaging position.

Further objects, features and advantages of this invention will become apparent from the following description when taken in connection with the accompanying drawings, in which:

Fig. 2 is a foreshortened plan view of the hoist in Fig. 1, in its floor-level position and showing the application thereto of the device of this invention for determining the axle-engaging positions of the blocks on the rear hoist;

Fig. 3 is an enlarged side elevational view of one of the axle blocks illustrated in Figs. 1 and 2, with certain parts broken away and other parts shown in section to more clearly show its construction;

Fig. 4 is a sectional view of a block as seen along the line 4—4 in Fig. 3; and

Fig. 5 is a perspective view of a combination measuring and axle block manipulating rod which forms part of the device of this invention.

Figure 1:
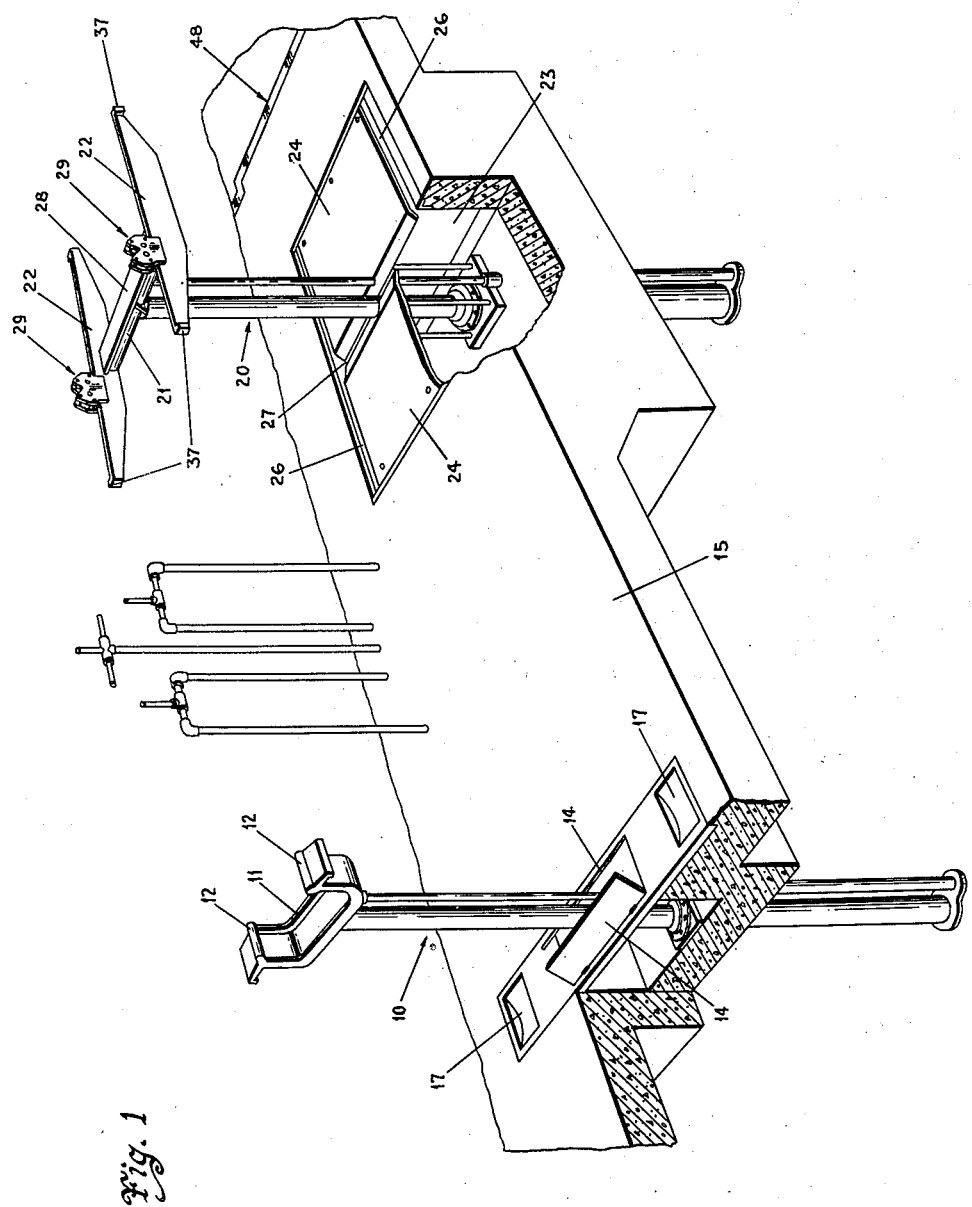
Fig. 1 is a perspective view of a two-post floor-level hoist in which the rear post is illustrated as being equipped with a pair of longitudinally movable or adjustable axle blocks, and with both of the posts being shown in their elevated positions.

With reference to the drawings there is illustrated in Figs. 1 and 2 a two-post hoist of floor level type, in which the front post, indicated generally as 10, is provided with a saddle member 11 having a pair of oppositely arranged seats 12 for engaging the front axle 13 of a vehicle to be elevated. When the hoist is in its lowered position, illustrated in Fig. 2, the front post 10 is completely covered by cover members 14. In this lowered position of the hoist, the vehicle to be elevated is driven over the hoist so that its front wheels 16 are received within a pair of oppositely arranged floor depressions 17 for the purpose of centering the vehicle axle 13 relative to the axle engaging seats 12, in a manner which is well known.

The rear post, indicated generally as 20, includes a vehicle supporting frame 21 having a pair of oppositely arranged transversely spaced longitudinally extended frame members 22 which are of a flat upright construction. The rear post 20 is receivable within a floor opening or pit 23 provided with a pair of stationary cover members 24 which are of a construction relative to the pit 23 to form a pair of longitudinally extended openings 26 for receiving the frame members 22 at a position below the level of the floor 15.

When the rear post 20 is in its lowered position, as illustrated in Fig. 2, the space or opening 27 between the cover members 24, is closed by a cover plate 28 movably supported on the frame structure 21, and adapted to be moved to a closing position for the space 27 concurrently with the lowering of the frame members 22 within the openings 26.

Movably carried on the frame members 22 for longitudinal movement are a pair of axle blocks 29. Since the axle blocks 29 are of a like construction and similarly assembled relative to a corresponding frame member 22, only one thereof will be referred to in detail in the following description.

An axle block 29 (Figs. 3 and 4) includes a pair of oppositely arranged upright plate members 31 having V-shaped recesses 30 formed in their upper ends adapted to receive therein the rear axle 35 of a vehicle to be lifted. Pin members 32, arranged at opposite sides of the recesses 30 connect the upper ends of the plates 31. The plate members 31 of an axle block 29 are connected together intermediate their lower and upper ends by a block member 38 secured therebetween, as by welding, at a position between the rollers 33.

Intermediate the upper and lower ends of the plate members 31, and rotatably supported therebetween in a longitudinally spaced relation, are a pair of rollers 33 adapted to ride on the top edge 34 of a frame member 22. The lower end sections 36 of the plate members 31 are in a straddling relation with the frame member 22 to guidably support the axle block 29 for movement longitudinally of the frame member. Stop members 37 (Figs. 1 and 2) are provided at opposite ends of a frame member 22 for engaging a plate member 31 to limit the longitudinal movement of the axle block 29 against rolling off of the frame member.

The device of this invention for determining the positions of the blocks 29 in which they will engage the vehicle rear axle 35, when the vehicle is in a position to be elevated, includes a combination measuring and block-manipulating rod 41 (Fig. 5) integrally formed at one end with a hand grip 42. Secured to the opposite end of the rod 41 is a substantially U-shape hook or block-engaging member 43 which is arranged in the plane of the hand grip 42 and secured to the rod 41 by welding, as indicated at 44.

Mounted on the rod 41, for adjustable movement longitudinally thereof, is a slide member 45 of a substantially spherical shape provided with a locking nut 46. When the nut 46 is loosened, the slide member 45 is freely movable longitudinally of the rod 41. On tightening of the nut 46, the slide member 45 is frictionally held against movement in an adjusted position.

To determine the axle-engaging positions of the blocks 29, the rod member 41 is initially extended longitudinally on the floor surface 15 to one side of the rear post 20, as shown in Fig. 2, such that the hook 43 is in line with the center line, indicated at 47, for the rear vehicle axle 32, and the grip end 42 of the rod 41 is located rearwardly of the rear post 20. With the rod 41 in this position, the slide member 45 is adjustably moved to a position in line with a transversely extended stationary gauge member or marker 48 which is arranged rearwardly of the rear post 20. The adjusted position of the slide member 45 thus defines a length of the rod 41 between its hook end 43 and the slide member 45, which is substantially equal to the distance between the rear axle center line 47 and the gauge 48.

The gauge member 48 is shown as being a flat bar member embedded within the floor 15. However, it is readily apparent that the gauge member 48 may consist of a line marking on the floor 15, or in some instances of a movable member adapted to be arranged relative to markings on the floor so as to extend transversely of the hoist and, if necessary, at a spaced position above the floor or ground surface 15.

With the slide 45 in an adjusted position on the rod 41, the rod 41 is manipulated to position the hook 43 over the rear one of the connecting pins 32 of a block 29, so that on movement of the rod 41 to again position the slide member 45 in line with the marker 48, the block 29 is concurrently moved to a position at which the vehicle axle 35 will be received within the notch 30.

As shown in Fig. 2, the marker 48, intermediate its ends, is formed with a center section 50 which is rearwardly offset relative to the marker end sections 51 with which the slide member 45 was initially aligned. The distance between the sections 50 and 51 of the marker 48, indicated as A in Fig. 2, is substantially equal to the distance between the longitudinal axis of a connecting pin 32 and the apex 52 of a V-shape notch 30, as indicated by the letter B, also in Fig. 2. The offset A thus compensates for the engagement of the hook 43 with a pin 32 at a distance B from the apex 52.

Although the invention has been described with respect to its application to the rear hoist of a two-post hoist, it is apparent that it is readily applicable to any type vehicle hoist which is equipped with longitudinally movable axle blocks, for engaging and supporting either axle of a vehicle. It is to be understood also that although the invention has been described with respect to a preferred embodiment thereof, that it is not to be so limited since modifications can be made therein which are within the full intended scope of this invention, as defined by the appended claim.

I claim:

Apparatus for positioning an adjustable vehicle axle-engaging block of a vehicle lift in a vehicle axle-engaging position comprising, a rod member having a hook at one end, an adjustable member adjustably supported on said rod member for movement longitudinally thereof, a gauge member adapted to be arranged transversely of the hoist and outwardly from one end thereof having an intermediate portion located within the transverse confines of the hoist, and end portions offset inwardly from said intermediate portion in a parallel relation with said intermediate portion, said end portions being projected outwardly from the transverse confines of the hoist, said axle-engaging block having an axle-receiving portion and a portion engageable with said hook arranged in a longitudinally spaced relation on said axle block such that the distance between said last two mentioned portions is substantially equal to the offset between the intermediate portion and an end portion of said gauge member, said rod member being initially arranged longitudinally of the hoist and to one side thereof with said hook centered relatively to the vehicle axle and said adjustable member moved to a position in line with one of said end portions to provide for the distance from the adjustable member to said hook being substantially equal to the distance between the center of the vehicle axle and said end portion, whereby when said hook is later engaged with said hook-engaging portion movement of the rod to a position at which the adjustable member is in line with said intermediate portion concurrently provides for the movement of said axle-receiving portion into an axle-engaging position.

HARRY D. SMITH.

REFERENCES CITED

The following references are of record in the file of this patent:

UNITED STATES PATENTS

| Number | Name | Date |
| --- | --- | --- |
| 184,459 | Coates | Nov. 21, 1876 |
| 340,883 | Kells | Apr. 27, 1886 |
| 365,181 | Heiron | June 21, 1887 |
| 1,392,125 | Dudash et al. | Sept. 27, 1921 |
| 1,598,248 | Paine | Aug. 31, 1926 |
| 2,086,402 | Countryman | July 6, 1937 |

FOREIGN PATENTS

| Number | Country | Date |
| --- | --- | --- |
| 79,976 | Switzerland | Feb. 1, 1919 |
| 273,972 | Italy | May 7, 1930 |